March 7, 1950     W. D. HORN ET AL     2,499,646
CHART VIEWER
Filed July 3, 1948     5 Sheets-Sheet 1
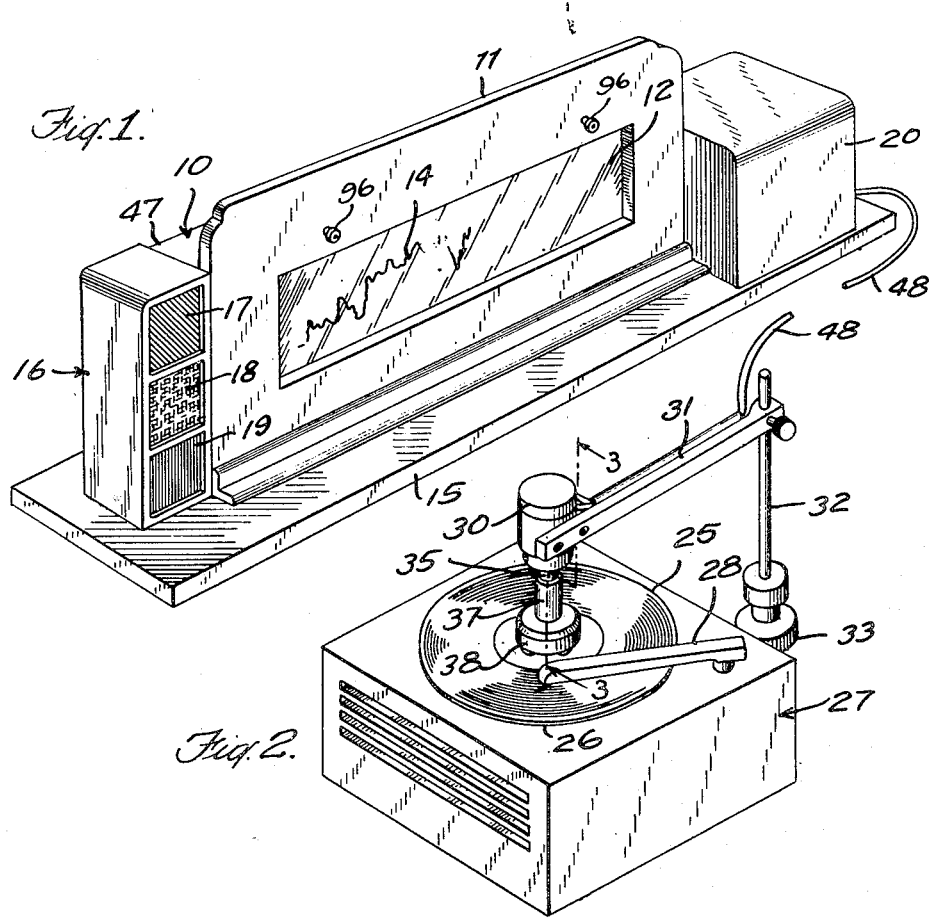
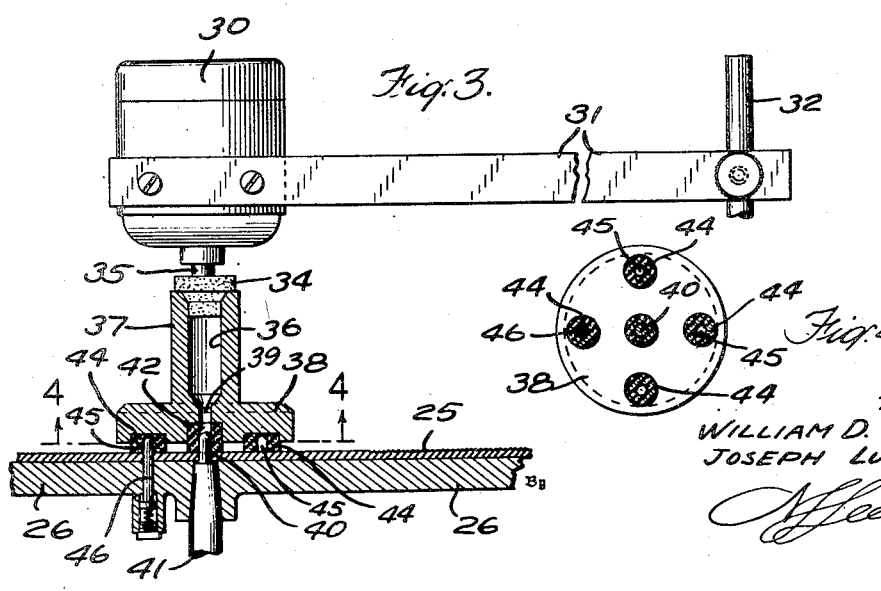
Inventors
WILLIAM D. HORN
JOSEPH LUKACS
Attorney

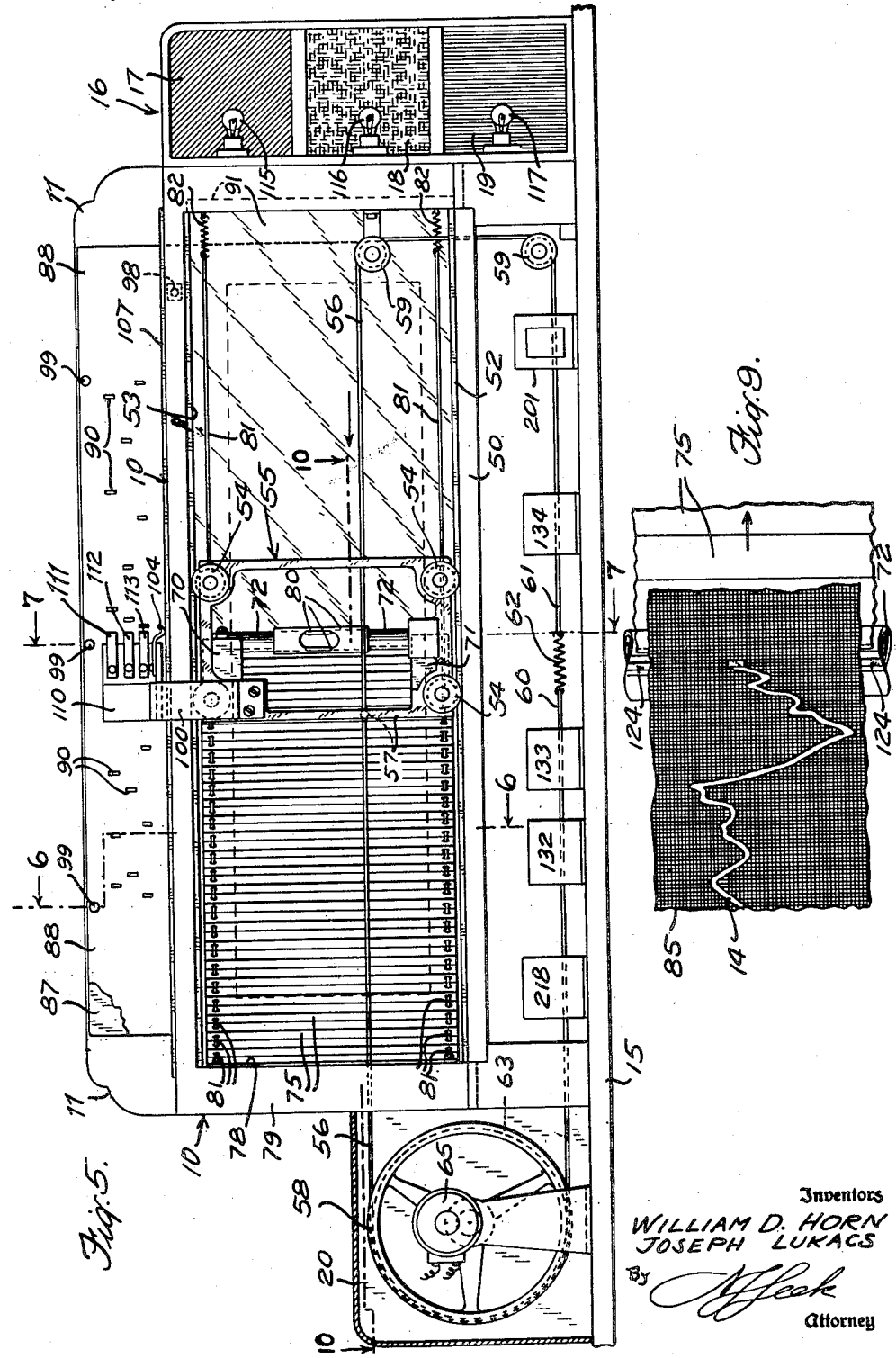

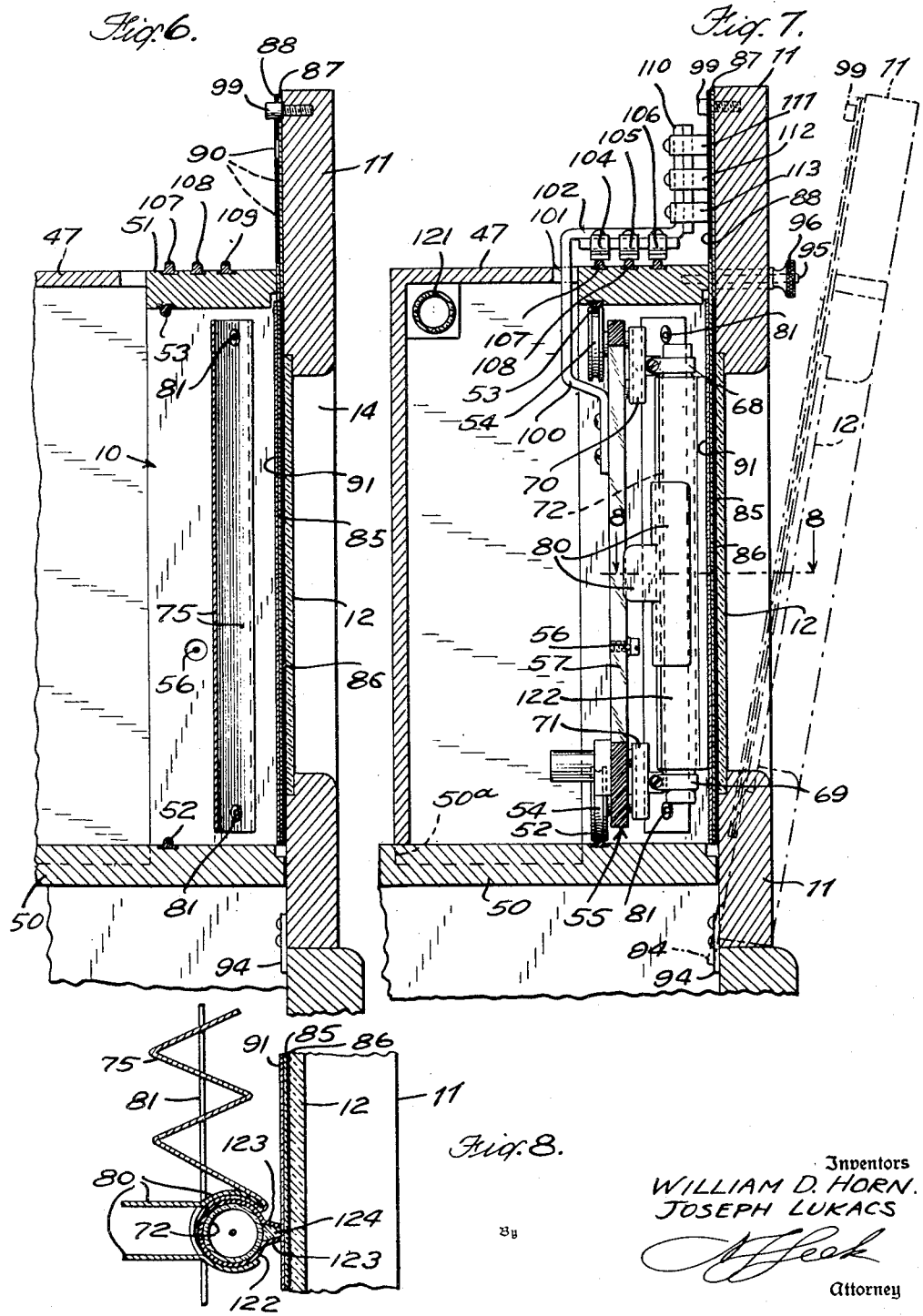

March 7, 1950    W. D. HORN ET AL    2,499,646
CHART VIEWER
Filed July 3, 1948    5 Sheets-Sheet 4
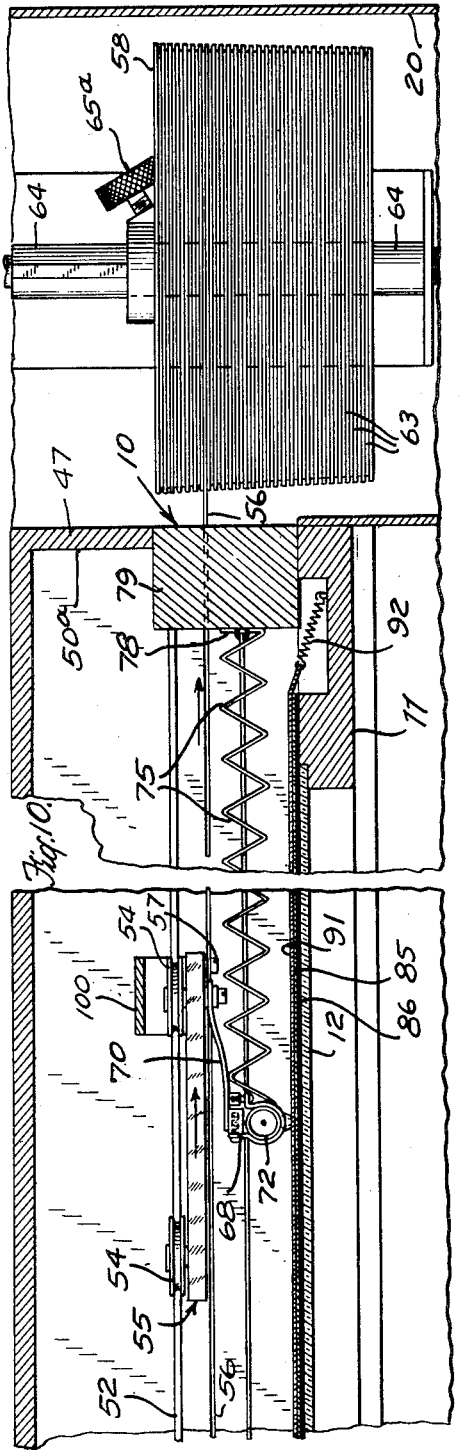
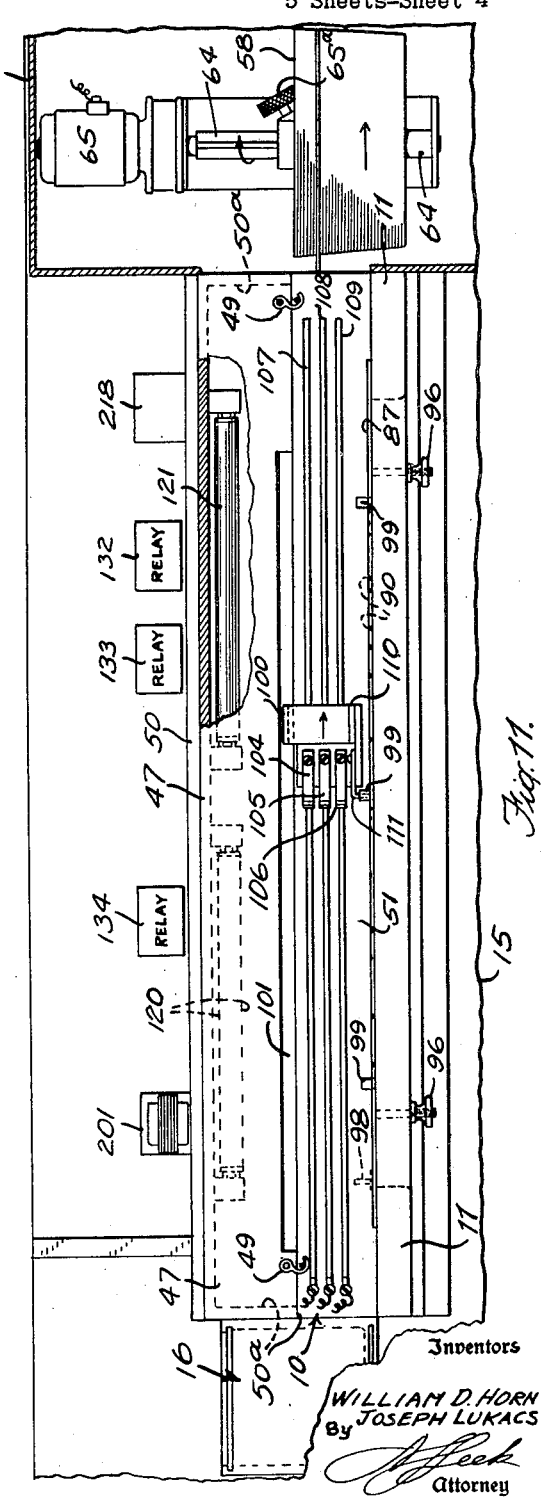
Inventors
WILLIAM D. HORN
JOSEPH LUKACS
By
Attorney March 7, 1950     W. D. HORN ET AL     2,499,646
CHART VIEWER Filed July 3, 1948     5 Sheets-Sheet 5

Inventors
WILLIAM D. HORN
JOSEPH LUKACS
By
Attorney

Patented Mar. 7, 1950

2,499,646

UNITED STATES PATENT OFFICE 2,499,646

CHART VIEWER

William D. Horn, New York, and Joseph Lukacs, Long Island City, N. Y.; said Lukacs assignor to said Horn Application July 3, 1948, Serial No. 36,968

4 Claims. (Cl. 35—54)

This invention relates to an animated chart viewer and more particularly to a viewer in which a chart is visually traced in a predetermined timed sequence in the view of an audience.

The invention is particularly applicable to visual charts of the above type which are synchronized with a recording of a radio program or the like to indicate the audience reaction to the different parts of the program. It may be used, however, in other embodiments where a chart is to be presented to an audience in synchronism with a recorded or oral explanation or as an accompaniment to a talk or lecture.

An object of the invention is to provide an apparatus of the above type in which a light spot appears to trace the chart on a suitable screen as the program proceeds.

Another object is to provide an apparatus of the above type in which the portion of the chart already traced appears as a luminous line, whereas the remaining portion of the chart is invisible.

Another object is to provide an apparatus of the above type in which the chart may be readily removed and replaced as required for different programs.

Another object is to provide an apparatus of the above type which includes visual means such as green, amber and red lights, or audible means, such as a buzzer or gong, or both, to indicate when the line being traced is in a predetermined mid-area of the chart, and when it is above or below the mid-area.

Another object is to provide on an apparatus of the above type novel and improved means for synchronizing the tracing light with a sound record.

Various other objects and advantages will be apparent as the nature of the invention is more fully disclosed.

In one embodiment of the invention, the chart which may represent audience reaction to a program and may be obtained in the manner indicated in Stanton Patent No. 2,373,511 dated April 10, 1945, is formed as a transparent line in an opaque chart sheet which is placed before a fixed light source and in back of the viewing glass. A vertical band of light from a movable source is caused to traverse the chart line in synchronism with a rendition of the program so that it appears as a moving spot of light tracing the chart. A shield is arranged to advance with the light band so as to expose the portion of the line already traced to light from said source, but to block off the untraced portion of the line. In order to prevent the untraced portion of the line from being visible from the front of the viewing glass due to the reflection of the light from the room, the chart sheet may be covered with a colored lacquer which conceals the line except when exposed to light rays from within the housing.

Green, amber and red lights are provided which are actuated by contact brushes travelling with the tracing light and adapted to close contacts for energizing the various lights at selected portions of the chart. Relay means may also be provided for causing the momentary actuation of a gong when the green light is energized and the momentary actuation of a buzzer when the red light is energized, so as to call the attention of the audience to the fact that the chart has reached a point above or below the mid-area.

The novel features which are characteristic of this invention will be better understood from the following description, taken in connection with the accompanying drawings in which a specific embodiment thereof has been set forth for purposes of illustration.

In the drawings:

Fig. 1 is a perspective view of an animated chart viewer embodying the present invention;

Fig. 2 is a perspective view of a program record player connected to be operated in synchronism with the chart;

Fig. 3 is a vertical section taken on the line 3—3 of Fig. 2 showing the synchronous transmitter attached to the record turntable;

Fig. 4 is a transverse section taken on the line 4—4 of Fig. 3;

Fig. 5 is a rear elevation of the viewer of Fig. 1;

Figs. 6 and 7 are transverse sections taken on the lines 6—6 and 7—7 of Fig. 5;

Fig. 8 is a horizontal section taken on the line 8—8 of Fig. 7;

Fig. 9 is an enlarged detail view of a portion of the chart and cooperating light and bellows;

Fig. 10 is a partial horizontal section taken on the line 10—10 of Fig. 5;

Fig. 11 is a top plan view of the animated chart viewer; and

Fig. 12 is a schematic diagram illustrating the electrical circuit involved.

Referring to the drawings more in detail, the viewer is shown in Fig. 1 as comprising a housing 10 having a front plate 11 carrying a viewing glass 12 through which a chart line 14 is visible. The housing 10 is mounted on a base 15 carrying a light box 16 having three light compartments carrying green, amber and red lenses 17, 18 and 19 and carrying a gear box 20 in which the driving pulley is located.

Referring to Fig. 2 a record 25 with which the chart is to be synchronized is shown as positioned on a turn table 26 of a record player 27 of standard construction having a tone arm 28.

For synchronizing the record 25 with the chart mechanism an electrical synchronous transmitter 30 is provided which is mounted on a bracket 31 (Figs. 2 and 3) which is adjustably supported on a vertical rod 32 having a base 33 for purposes of support. The synchro-unit is provided with a shaft 35 carrying a cone-shaped connector 34 which is frictionally secured in the bore 36 of a sleeve 37 carrying at one end a disc 38 having a bore 39 adapted to fit over the end 40 of the turntable shaft 41. A bushing 42 is shown as seated in a central recess in the disc 38 to facilitate mounting the same on the end of the turntable shaft 41.

The face of the disc 38 is provided with a plurality of inserts 44 having central recesses 45 adapted to engage a spring-pressed plunger 46 of the type commonly carried on turntables for use in connection with electrical transcriptions which must be accurately timed and must be secured against slippage on the turntable. In the embodiment shown in Figs. 3 and 4 four such inserts 44 are shown. It is to be understood, however, that three or more may be used as required or the inserts 44 may be formed in the shape of a continuous ring. The synchro-transmitter unit 30 is connected by a line 48 (Fig. 2) to a similar receiver unit to be described in the viewer shown in Fig. 1.

In operation, the disc 38 is positioned on the record 25 after the latter has been placed on the turntable 26 and is turned until the spring-pressed plunger 46 enters the recess 45 of an insert 44. The connector 34 of the synchro-transmitter unit 30 is then positioned in the bore 36 of the sleeve 37, the bracket 31 is adjusted to the correct elevation on the rod 32, and the support 33 is placed on the surface carrying the record player 27.

After the record has been played the entire synchro-unit may be lifted therefrom by means of the bracket 31 to facilitate the removal of the record.

Referring to Figs. 5, 6 and 7, the housing 10 is shown as comprising rear cover 47, bottom 50 and top 51 carrying rails 52 and 53 respectively on which wheels 54 of a carriage 55 ride. The rear cover 47 may be secured to the top 51 by hooks 49 (Fig. 11). The bottom of the rear cover 47 seats in depression 50a in bottom 50.

The carriage 55 is shown as driven by a metal cable 56 which is secured to a post 57 on the carriage 55 and extends over a driving pulley 58 and idler pulleys 59 and has its ends 60 and 61 secured together by a spring 62. The driving pulley 58, as shown in Figs. 10 and 11, is somewhat conical in shape and is provided with a plurality of grooves 63 which are of different circumferential lengths. The pulley 58 is keyed to a shaft 64 for axial movement thereon and may be locked in selected position by means of a set screw 65a.

In operation the pulley 58 is shifted axially until the desired groove 63 is brought into registration with the driving cable 56 and is locked in this position by tightening the set screw 65a. The different grooves 63 provide means for adjusting the driving ratio as required for synchronizing purposes.

The shaft 64 is driven through suitable gears, not shown, by a synchronous electrical receiver unit 65 which is similar to the unit 30 and is connected thereto by the line 48 and is of a type which is driven in synchronism with the unit 30 so that the operation of the driving pulley 58 is synchronized with the operation of the record turntable 26.

The carriage 55 carries upper and lower clips 68 and 69 (Fig. 7) which are mounted on spring arms 70 and 71 (Figs. 5, 7 and 10) attached to the carriage 55 and electrically connected to rails 52 and 53 by brushes (not shown). The carriage 55 may be made of insulating material, preferably of a transparent material such as plastic. A light bulb 72 of the type having an elongated filament or a fluorescent tube is provided with terminal sockets at its two ends held in the clips 68 and 69.

A bellows shield 75 (Figs. 5, 8 and 10) is attached at one end 78 to the end 79 of the housing 10 and at its other end to a clip 80 (Figs. 5, 7 and 8) which is adapted to slip over the light bulb 72. The bellows shield 75 is guided on stationary wires 81 which extend the length of the housing 10 and are secured at their ends by suitable springs 82.

Referring to Figs. 6 and 7 the housing 10 carries a viewing glass 12 in back of which is placed a chart sheet 85 in which the line 14 is cut or the sheet 85 may be in the form of a thin film having an opaque coating thereon which is scratched to leave a transparent line 14. A coating 86 of a colored plaster sheet such as "Zip-A-Tone" is placed over the chart sheet 85 to conceal the position of the unexposed portion of the chart line 14 from the observer.

A contact strip 87 of a metal such as brass, is cemented to the upper portion of the chart sheet 85. The strip 87 is provided with a coating 88 of insulating material, such as an insulating lacquer, which is scraped off at suitable points to provide contact areas 90 (Fig. 5). A protective sheet 91 of flexible plastic, such as "Lucite" is placed in back of the chart sheet 85. The strip 91 is secured at the ends by springs 92 (Fig. 10) which are arranged to hold the strip tight so as to reduce the friction, but provide sufficient resilience to permit the chart sheet 85 to be readily inserted or removed.

With the front plate 11 in closed position, as shown in Fig. 6, the chart sheet is secured by means of three studs 99 between the front 11 and the top 51, but with the front in open position as shown in dotted lines in Fig. 7 the chart sheet and contact strip may be readily removed from between the strip 91 and the glass 12. The front 11 is held in position at the bottom by clips 94 (Figs. 6 and 7) and the top by studs 95 and nuts 96 (Figs. 1, 7 and 11). The metal contact strip 87 engages a spring-pressed contact pin 98 (Fig. 11) by which electrical connection is made thereto.

A brush support 100 (Fig. 7) is secured to the carriage 55 and projects upwardly through an elongated slot 101 in the top 51. The support 100 is provided with a horizontal section 102 carrying three brushes 104, 105 and 106 which are adapted to make contact respectively with busses 107, 108 and 109 which are mounted on the top 51. The brush support 100 is also provided with a vertical section 110 carrying brushes 111, 112 and 113 which are spaced vertically and are positioned to wipe across the insulating lacquer surface of the contact strip 87 and to make contact with the strip 87 at the areas 90 where the lacquer is removed. The brushes 111, 112 and 113 are connected respectively to the brushes 104, 105 and 106 by connecting leads, not shown.

Referring to Fig. 5, lights 115, 116 and 117 are positioned in respective lamp compartments in the light box 16 in registration with the lenses 17, 18 and 19. Referring to Figs. 7 and 11, a plurality of elongated lights 120 and 121 are disposed in the housing 10 for illuminating the chart line 14.

Referring to Fig. 8, the light 72 is provided with a shield 122 which extends entirely around the bulb to shield the same and is provided with forwardly extending flanges 123 between which is positioned a rod 124 of light transmitting material, such as "Lucite," which engages the Lucite strip 91 as the carriage moves along the tracks 52 and 53 (Fig. 6).

In the operation of the device thus far described the chart line 14 which is to be viewed in conjunction with the program recorded on the record 25 is formed on the chart sheet 85. Such chart may comprise for example a plotting of the audience reaction to the different parts of the program as obtained in a previous survey. If the chart sheet 85 is of metal or a solid material the line 14 may be cut therein by a saw. If, however, the chart sheet 85 is a film having an opaque coating, the line 14 may be formed thereon by removing the coating to leave a transparent line.

Referring to Figs. 5, 7 and 8, the contact strip 87 is attached to the chart sheet by suitable means as by glue and appropriate contact areas 90 (Fig. 5) are made by removing the insulating lacquer from the back of the contact strip at the selected points. These areas are selected to make contact with the brushes 111, 112 and 113 when the line 14 crosses the boundary of a predetermined central area and are for the purpose of energizing the lights 115, 116 and 117, as will be described.

The front 11 is released and tilted forwardly as indicated in Fig. 7, and the chart sheet inserted between the glass 12 and the backing sheet 91 with the contact strip 87 engaging the contact pin 98 (Fig. 5). The front is then closed to the position shown in Fig. 6 and the carriage 55 is moved to the extreme lefthand side as seen from the front wherein the light vertical band from the light 72 is brought to register with the beginning of the chart line 14. In this position the bellows shield 75 covers the remainder of the chart to prevent passage of light therethrough from the lights 120 and 121 within the housing and the coating 86 on the front of the chart sheet prevents the unlighted portion of the line 14 from being visible from the front of the apparatus.

The record 25 is now placed on the turntable 26 and the disc 38 is brought into contact therewith as previously described. As the record is now played the synchronous transmitter 30, which is driven by the turntable, drives the synchronous receiver 65 and causes operation of the cable pulley 58 in exact synchronism therewith. Hence the carriage 55 is driven along the tracks 52 and 53 in exact synchronism with the playing of the record. As the light 72 moves along the chart the intersections of the chart line 14 with the band of light projected through the transparent strip 124 appears as a bright spot which traces the chart line 14 as the carriage advances. However, as the carriage advances the bellows shield 75 likewise recedes from the forward end of the chart exposing the portion of the chart which has been traced by the light from the source 72. Hence this portion of the chart is illuminated by the lights 120 and 121 in the housing and appears as a luminous line. The light spot produced by the light 72 thus indicates the position of the chart corresponding to the exact portion of the program being played at that instant, and the luminous line shows the path already traced by the light spot.

The adjustable cable pulley 58 provides means for adjusting the movement of the carriage 55 in accordance with minor variations in the length of the chart so that exact synchronism with the program may be obtained.

The arrangement of the contact areas 90 (Fig. 5) is such that when the light spot appears in a preselected mid-area, the amber light 18 is illuminated. When the light spot moves above that area, the green light is illuminated, thereby indicating for example a more favorable audience reaction, and when the light spot passes below the mid-area, the red light 19 is actuated to indicate a less favorable audience reaction.

As outlined above, the green light 17 may be accompanied by an audible signal, such as a gong, and the red light 19 may be accompanied by an audible signal such as a buzzer. The electrical circuits for carrying out this response are shown more in detail in Fig. 12 as follows.

In Fig. 12 a 110 volt supply line is indicated at 130 and a 6 volt supply line at 131. Relays 132, 133 and 134 are provided respectively to be actuated with the green, amber and red lights 115, 116 and 117. The busses 107, 108, and 109 are connected respectively by leads 135, 136 and 137 to one side of coils 138, 139 and 140 of the relays 132, 133 and 134 respectively, and to one side of the respective lights 115, 116 and 117. The return sides of the coils 138, 139 and 140 and of the lights 115, 116 and 117 are connected to a return lead 141 which is connected through a switch 142 to the return side 143 of the 6 volt supply line 131. The contact strip 87 is connected by a lead 144 to the opposite side 145 of the 6 volt supply line 131. Hence when the brushes 111, 112 and 113 make contact with the contact areas 90, a circuit is established from the 6 volt supply line 131 through one or the other of the coils 138, 139 and 140 and the corresponding lights 115, 116 and 117.

A holding circuit for the coil 138 is established through contact 150 and switch arm 151 of the relay 132, line 152, arm 153 of the relay 133, back circuit 154, line 155, back contact 156 and arm 157 of the relay 134 and line 158 to the 6 volt supply line 145. Hence the coil 138 remains energized as long as coils 139 and 140 are both deenergized.

A holding circuit for the coil 139 is established through a contact 160 and arm 161 of the relay 133 lead 162, arm 163 and back contact 164 of the relay 134, lead 165, back contact 166 and arm 167 of the relay 132 and lead 168 to the 6 volt supply line 145. Hence the coil 139 remains energized as long as coils 138 and 140 are both deenergized.

A holding circuit is established for the coil 140 through contact 170 and arm 171 of the relay 134, lead 172, back contact 173 and arm 174 of the relay 133, lead 175, back contact 176 and arm 177 of the relay 132 and leads 178 and 168 to the 6 volt supply line 145. Hence the coil 140 remains energized as long as coils 138 and 139 are both deenergized.

In this way when a relay and its light are once energized by one of the brushes making contact with an area 90 the light and relay remain energized until the circuit is broken by another brush making contact with a contact area 90 to energize a second relay and a second light.

The relay 132 also establishes a circuit from the 110 volt supply line to a time delay relay 204 as follows.

Beginning with a 110 volt lead 191 the circuit is completed through arm 192 and contact 193 of relay 132, thence through a lead 194 to a lead 195, resistor 196, rectifier 197, condenser 198 and resistor 199 in parallel, and lead 200 to the return side of the 110 volt line 130. A relay coil 201 is connected across the condenser 198 and is adapted to be energized for actuating an arm 202 to open a back contact 203 when the voltage across the condenser 198 has been built up to a predetermined value. The relay 204 accordingly constitutes a time delay relay which actuates a predetermined time interval after the closing of the contact 193 which interval is dependent upon the size of the condenser 198 and of the resistance 199. The time delay relay coil 201 is also energized from the 110 volt line 191 through a lead 205, arm 206 and contact 207 of the relay 134, and lead 208. Hence the contacts 207 and 193 are connected in parallel and the time delay relay coil 201 is energized by actuation of either the relay 132 or the relay 134.

A gong 190 is energized through a circuit including the 6 volt supply line 145, leads 168 and 178, arm 177 and contact 210 of the relay 132, lead 211, coil 212 of the gong 190, return lead 213, contact 203, arm 202 of the time delay relay, lead 214, switch 215 to the return side 216 of the 6 volt line 131. Hence the gong 190 is actuated upon energization of the coil 138 of the relay 132 and the circuit is broken after a predetermined time interval by actuation of the time delay relay 204.

A buzzer 218 is actuated by a circuit from the 6 volt supply line 145 which includes the lead 144, contact strip 87, contact area 90, brush 113, brush 106, a bus 109, lead 137, lead 219, coil 220 of the buzzer 218, buzzer contact 221 and arm 222, return lead 213, back contact 203 and arm 202 of the time delay relay 204, lead 214, switch 215 and lead 216 to the return side of the 6 volt line 131. Hence the buzzer 218 is actuated while the brush 113 is on the contact area 90 for energizing the relay 134 for a period of time until the contact 203 is broken by actuation of the time delay relay 204.

The gong 190 is thus actuated to produce a single tone when the green light relay 132 is closed and the buzzer 218 is actuated for a short time only when the suitable contact is made for energizing the red light relay 134. In the above described system, as the audience hears the playing of the recording 25 which may constitute a radio program or an explanation of a sales chart, or the like, or hear an oral talk which is synchronized with the tracing of the chart 14, the audience sees the visual tracing of the chart by means of the light spot, followed by a luminous line indicating the portion of the chart previously traced, together with a green, amber or red light indicating whether the chart is in the mid-area or above or below the mid-area.

In order to further draw attention to the fact that the chart has reached a point either above or below the mid-area the gong and buzzer are respectively actuated. Hence the audience obtains both a visual and an audible indication of the movement of the chart so that the most effective response is obtained thereto.

Obviously, if the chart sheet 85 comprises a thin metal strip, the chart sheet and contact strip 87 may be made as a single unit. Alternatively, if the chart sheet 85 comprises a thin plastic sheet of insulating material, the sheet may be extended to the area occupied by the contact strip 87 and contact may be made by cementing contact members to the strip at the selected locations. Also the cable drive may be replaced by other driving means, such as a screw feed, if desired, particularly if minor adjustments in the driving relationship are not required.

Various other modifications will be apparent to a person skilled in the art.

Although a specific embodiment of the invention has been shown, it is to be understood that the invention may be applied to various uses and is suited for oral presentation as well as recordings, although the automatic synchronizing means makes the apparatus especially suitable for playing recordings of the type above referred to.

What is claimed is:

1. A chart viewer comprising a housing having a light source therein, an opaque chart sheet carrying a chart in the form of a transparent line mounted at the front of said housing so that said line passes light from said source, a movable shield disposed between said source and said chart sheet to block off the rays from said source, a carriage in said housing mounted to move along the back of said chart sheet, a light source on said carriage and means associated with said light source to project a narrow vertical band of light onto said chart sheet which appears as a light spot at the intersection of said band and said line which traces the line as said carriage advances therealong, said shield being movable with said carriage to expose the portion of said line already traced by said light spot.

2. A viewer, as set forth in claim 1, in which said second light source comprises an elongated tube, a shield is disposed around said tube having an elongated light opening facing toward said chart sheet and a light transmitting member is disposed in said opening with an elongated surface adjacent said sheet to direct a vertical band of light thereto.

3. A viewer, as set forth in claim 2, in which said first shield comprises a collapsible bellows having one end fixed adjacent the trailing end of said chart and having its other end attached to said light bulb to feed therewith along said sheet.

4. A viewer, as set forth in claim 1, in which said chart sheet comprises an opaque film having a transparent chart line thereon, and a colored film on the front of said opaque film to conceal the line from an observer except when exposed to the light from said source.

WILLIAM D. HORN.
JOSEPH LUKACS.

REFERENCES CITED

The following references are of record in the file of this patent:

UNITED STATES PATENTS

| Number | Name | Date |
|---|---|---|
| 1,170,325 | Poposkey | Feb. 1, 1916 |
| 1,809,162 | Egeland | June 9, 1931 |
| 2,082,261 | Runyan | June 1, 1937 |
| 2,113,226 | Young | Apr. 5, 1938 |
| 2,247,659 | Hoehn | July 1, 1941 |
| 2,373,511 | Stanton | Apr. 10, 1945 |

FOREIGN PATENTS

| Number | Country | Date |
|---|---|---|
| 318,877 | Great Britain | Sept. 9, 1929 |